(12) United States Patent
Gysling et al.

(10) Patent No.: US 11,433,322 B2
(45) Date of Patent: Sep. 6, 2022

(54) SQUEEZE FILM DAMPER ACOUSTIC ISOLATION

(71) Applicant: United Technologies Corporation, Farmington, CT (US)

(72) Inventors: Daniel L. Gysling, South Glastonbury, CT (US); Gregory E. Reinhardt, South Glastonbury, CT (US); Daniel A. Szkrybalo, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 389 days.

(21) Appl. No.: 16/550,020

(22) Filed: Aug. 23, 2019

(65) Prior Publication Data

US 2021/0054880 A1 Feb. 25, 2021

(51) Int. Cl.
| | | |
|---|---|---|
| *F16C 27/00* | (2006.01) | |
| *B01D 19/00* | (2006.01) | |
| *B04C 5/04* | (2006.01) | |
| *B04C 5/081* | (2006.01) | |
| *F16C 27/02* | (2006.01) | |
| *F01D 25/16* | (2006.01) | |
| *F16C 27/04* | (2006.01) | |

(52) U.S. Cl.
CPC ............ *B01D 19/0057* (2013.01); *B04C 5/04* (2013.01); *B04C 5/081* (2013.01); *F16C 27/02* (2013.01); *F01D 25/166* (2013.01); *F16C 27/045* (2013.01); *F16C 2360/23* (2013.01)

(58) Field of Classification Search
CPC ....... B01D 19/0057; B04C 5/04; B04C 5/081; F16C 27/02; F16C 2360/23; F16C 27/045; F01D 25/166; F16F 15/162; F16F 15/0237
See application file for complete search history.

(56) References Cited

U.S. PATENT DOCUMENTS

| | | | | |
|---|---|---|---|---|
| 3,784,267 A | * | 1/1974 | Davis | F16C 27/045 384/453 |
| 5,207,511 A | | 5/1993 | Bobo | |
| 6,135,639 A | * | 10/2000 | Dede | F16C 27/045 384/99 |
| 9,464,669 B2 | | 10/2016 | Kerr et al. | |
| 9,915,174 B1 | * | 3/2018 | Morris | F16F 9/02 |

(Continued)

FOREIGN PATENT DOCUMENTS

| | | |
|---|---|---|
| EP | 3228886 A1 | 10/2017 |
| EP | 3453912 A1 | 3/2019 |
| GB | 1301282 A | 12/1972 |

OTHER PUBLICATIONS

European Search Report dated Jan. 22, 2021 for European Patent Application No. 20192496.6.

(Continued)

*Primary Examiner* — Dung H Bui (74) *Attorney, Agent, or Firm* — Bachman & LaPointe, P.C.

(57) ABSTRACT

A machine has a first member; a second member; a third member; a bearing having an inner race mounted to the second member and an outer race mounted to the third member; a damper chamber between the first member and the third member; a fluid outlet in the first member to the damper chamber; a fluid supply flowpath to the fluid outlet; and an unvented chamber open to and locally above the fluid supply flowpath.

22 Claims, 4 Drawing Sheets

(56) References Cited

U.S. PATENT DOCUMENTS

| | | | |
|---|---|---|---|
| 2003/0189382 A1* | 10/2003 | Tornquist | F16C 33/76 310/90 |
| 2004/0062460 A1 | 4/2004 | Dusserre-Telmon et al. | |
| 2011/0046933 A1 | 2/2011 | Skelly et al. | |
| 2015/0240867 A1 | 8/2015 | Amador et al. | |
| 2016/0186607 A1 | 6/2016 | Witlicki et al. | |
| 2016/0333736 A1 | 11/2016 | Parnin | |
| 2017/0122369 A1 | 5/2017 | Smedresman et al. | |
| 2018/0023418 A1 | 1/2018 | Forcier | |
| 2018/0245632 A1 | 8/2018 | Obara et al. | |
| 2018/0306061 A1 | 10/2018 | Husband et al. | |
| 2019/0055853 A1 | 2/2019 | Smedresman et al. | |
| 2020/0056677 A1* | 2/2020 | Schmidt | F01D 5/10 |

OTHER PUBLICATIONS

Bugra H. Ertas et al., Synchronous Response to Rotor Imbalance Using a Damped Gas Bearing, J. Eng. Gas Turbines Power, 132(3), 032501, Dec. 1, 2009, The American Society of Mechanical Engineers, New York, NY.

* cited by examiner

SQUEEZE FILM DAMPER ACOUSTIC ISOLATION

BACKGROUND

The disclosure relates to squeeze film dampers. More particularly, the disclosure relates to acoustic isolation of squeeze film dampers in turbomachine bearing systems.

Turbomachines (e.g., gas turbine engines (broadly inclusive of turbofans, turbojets, turboprops, turboshafts, industrial gas turbines, and the like)) have numerous rolling element (ball or roller) bearing systems intervening between one or more rotors (engine spools) and static or fixed structure (e.g., the engine case). Various spring mounting/retaining systems exist such as to accommodate tolerance of the rotating components, vibration, inertial loading due to aircraft maneuvering, and the like. The spring action may be damped by a fluidic damper (e.g. a "squeeze-film" damper which may use bearing lubrication oil as the fluid). One genus of these systems involve springs which are often referred to as "squirrel cage" springs due to their geometry. In addition to the radial spring action, depending on implementation the spring may serve to axially position the associated bearing race.

One example of a squirrel cage retainer is disclosed in U.S. Pat. No. 9,464,669 (the '669 patent) of Kerr et al., Oct. 11, 2016, the disclosure of which is incorporated by reference in its entirety herein as if set forth at length. The term "squirrel cage" relates somewhat to the hamster wheel like appearance of the spring/retainer with two full annulus end portions separated by a center portion having a circumferential array of longitudinal beams or legs joining the two end portions and separated by gaps. The circumferential array of legs and gaps provides flexibility at a desired spring rate allowing excursions of the two end portions off their coaxial condition. In the '669 patent configuration, one of the ends (the proximal end and, in the example, forward end) comprises a mounting flange for mounting to the associated structure (e.g., static structure in that example). The opposite second end portion has features for bearing engagement and fluid damping. Specifically, the inner diameter (ID) surface of the second end portion is dimensioned to receive the outer diameter (OD) surface of the associated bearing outer race. The ID surface face may bear features for also axially retain/engaging the outer race.

The OD surface of the second portion bears two annular grooves. The grooves each carry a seal (e.g., a ring seal such as a piston ring seal (e.g., metallic), an elastomeric O-ring seal, spring-loaded carbon seal, or the like). The second portion is mounted in close sliding relationship surrounded by external structure including one or more fluid ports between the two grooves/seals. Pressurized fluid (e.g., oil) is introduced via the ports. The fluid in the damping chamber formed between the grooves/seals maintains a fluid film in the region between the grooves. This thin film (the "squeeze film") provides small amounts of displacement and damping. The natural frequency of the system is a function of the effective mass of the system, spring rate, and the squeeze-film damping. The presence of the two grooves and seals renders the configuration a "closed damper" configuration (although there will be small amounts of leakage past the seals).

A more complex configuration of squirrel cage is shown in U.S. Patent Application Publication No. 2017/0122369A1 (the '369 publication) of Smedresman et al., May 4, 2017, the disclosure of which is incorporated by reference in its entirety herein as if set forth at length. The '369 publication has a retainer wherein the first end portion also engages the outer race of a different bearing. In the '369 publication configuration, the forward portion of the retainer has a fluid damping relationship with the outer race of the associated bearing in a similar way as the static structure has to the second end portion of the retainer of the '669 patent.

Yet other variations are more complicated and have more convoluted cross-sectional profiles. For example, whereas the aforementioned examples have the squirrel cage center portion extending close to straight axially between two axial end portions, other configurations having jogs or zigzags in their axial cross-section are possible. Several such variations are variations disclosed in U.S. Patent Application Publication No. 2015/0240867A1 (the '867 publication) of Amador et al., Aug. 27, 2015, the disclosure of which is incorporated by reference in its entirety herein as if set forth at length.

A further zigzag configuration is shown in U.S. Patent Application Publication 2016/0186607A1 (the '607 publication) of Witlicki et al., Jun. 30, 2016, the disclosure of which is incorporated by reference in its entirety herein as if set forth at length where a two-piece spring/damper is created by having a squirrel cage spring extending axially between one axial end portion and a second axial end portion of that spring. However, the damper is formed along a second piece having a first axial end mounted to the second axial end of the spring and having a body extending axially back towards the spring first end portion to join a second end portion bearing the grooves for the seals for the damper. Thus, the first end portion of the spring which serves for mounting may be axially very close to the second end portion of the second piece which bears the damping features. Depending upon the situation, the second piece may itself have a squirrel cage spring construction or may be relatively rigid.

Further configurations differing in seal arrangement are shown in U.S. Patent Application Publication 2019/0055853A1 (the '853 publication) of Smedresman et al., filed Feb. 21, 2019, and entitled "Bearing Centering Spring and Damper", the disclosure of which is incorporated by reference herein in its entirety as if set forth at length. Examples involve a first seal ring in conventional outer diameter (OD) groove in the inner member at one axial end of the damping chamber but lacking a second seal ring at the other axial end. Instead, there may be a tight tolerance or a labyrinth arrangement.

Further configurations differing in seal arrangement are shown in U.S. patent application Ser. No. 15/956,007 (the '007 application) of Smedresman et al., filed Apr. 18, 2018, and entitled "Bearing Centering Spring and Damper", the disclosure of which is incorporated by reference herein in its entirety as if set forth at length. Examples involve a first seal ring in conventional outer diameter (OD) groove in the inner member at one axial end of the damping chamber and a second seal ring in an axially open rebate in the outer member at the other axial end.

Further configurations differing in seal arrangement are shown in U.S. patent application Ser. No. 16/041,041 (the '041 application) of Smedresman et al., filed Jul. 20, 2018 and entitled "Bearing Centering Spring and Damper", the disclosure of which is incorporated by reference herein in its entirety as if set forth at length. Examples involve a first seal ring in conventional outer diameter (OD) groove in the inner member at one axial end of the damping chamber and a second seal ring in an inner diameter (ID) groove in the outer member at the other axial end.

A further damper configuration is the "open damper" which lacks the two grooves/seals. See, Bugra H. Ertas et al., "Synchronous Response to Rotor Imbalance Using a Damped Gas Bearing", *J. Eng. Gas Turbines Power*, 132(3), 032501, Dec. 1, 2009, The American Society of Mechanical Engineers, New York, N.Y. Such a configuration allows escape of fluid from the gap between spring and static structure. A greater supply of fluid will be required in an open damper relative to a similar closed damper and the configuration will have different damping characteristics.

In exemplary systems, the fluid supplied to the squeeze film damper comprises oil. In particular, oil is often taken from the supply used for bearing lubrication. The turbomachine may have a recirculating system wherein oil is collected from the bearings (and potentially damper leakage) and pumped back along branching flowpaths to the bearings and dampers. An exemplary flowpath passes sequentially through a scavenge pump, debris monitor, deaerator, and oil reservoir, then branching through individual branches to each individual damper via a respective pump, filter, and valving. Another example of United Kingdom Patent GB1301282A (GB '282) of Gardiner, Dec. 29, 1972, "Lubrication system for Gas Turbine Engines", discloses a system wherein the oil supply includes a powered centrifugal separator to separate and vent air from the oil.

Squeeze film dampers typically generate pressure oscillations at integral engine orders. These pressure oscillations can excite acoustic modes in the oil supply line(s) to the damper(s). This type of interaction can be analyzed with a Campbell diagram in which the frequency of relevant acoustic modes of the oil supply line are plotted along with integral engine order frequencies versus rotor speed. The speeds at which engine order drivers cross relevant acoustic modes are termed Campbell crossings. At these crossings, integral engine order forcing from the squeeze film damper will drive the acoustic modes at resonance. Depending on the resulting amplitude of oscillation, these crossings can result in undesirable dynamic response of the coupled squeeze film damper and supply line.

For turbomachines, the oil supplied to the damper(s) often has some amount of entrained air due to imperfect air/oil separation within the lubrication system. The exact amount of air (termed "gas-carry-under") is typically not known, but gas volume fractions of air in the oil mixture can typically range from fractions of a percent to several percent by volume.

This variability in the entrained air content can have a profound effect on the speed of sound of the fluid (bubbly oil-air mixture) supplied to the squeeze film damper(s). A small change in entrained air content can result in large changes in sound speed. Because the acoustic modes of the oil supply system are proportional to the speed of sound in the supplied air-oil mixture, variability in gas carry under results in variability in the Campbell crossing speeds.

Separately, in the commercial/industrial plumbing industry, pressure accumulators are used to reduce an effect often referred to as "water hammer" wherein cyclic oscillations in fluid pressure are significantly higher than the median pressure of the system. In this system, a gas-filled bladder is inserted and exposed to the liquid at the pressure of the liquid. The gas-filled bladder is typically orders of magnitude more compliant than the liquid, and serves as a pressure node for the liquid-filled acoustics systems.

SUMMARY

One aspect of the disclosure involves a machine comprising: a first member; a second member; a third member; a bearing having an inner race mounted to the second member and an outer race mounted to the third member; a damper chamber between the first member and the third member; a fluid outlet in the first member to the damper chamber; a fluid supply flowpath to the fluid outlet; and an unvented chamber open to and locally above the fluid supply flowpath.

A further embodiment of any of the foregoing embodiments may additionally and/or alternatively include the unvented chamber having a volume 25% to 300% of a volume of the damper chamber.

A further embodiment of any of the foregoing embodiments may additionally and/or alternatively include the unvented chamber being a portion of a centrifugal separator comprising: an inlet; an outlet; and said unvented chamber extending above the inlet and outlet.

A further embodiment of any of the foregoing embodiments may additionally and/or alternatively include the centrifugal separator comprising: a centrifuge chamber wherein the inlet is positioned to introduce a flow tangentially to a first sidewall surface of the centrifuge chamber; and a second sidewall surface portion converging from the first sidewall surface portion toward the outlet.

A further embodiment of any of the foregoing embodiments may additionally and/or alternatively include the centrifugal separator comprising a centrally apertured plate between the unvented chamber and the centrifuge chamber.

A further embodiment of any of the foregoing embodiments may additionally and/or alternatively include the centrifugal separator being an unpowered separator.

A further embodiment of any of the foregoing embodiments may additionally and/or alternatively include the centrifugal separator comprising a downstream convergent portion positioned to receive a tangential flow from the inlet and pass the flow to the outlet, the unvented chamber extending above the downstream convergent portion.

A further embodiment of any of the foregoing embodiments may additionally and/or alternatively include upstream of the centrifugal separator along the fluid supply flowpath: a reservoir; and a pump.

A further embodiment of any of the foregoing embodiments may additionally and/or alternatively include the fluid comprising oil.

A further embodiment of any of the foregoing embodiments may additionally and/or alternatively include upstream of the centrifugal separator along the fluid supply flowpath: a deaerator.

A further embodiment of any of the foregoing embodiments may additionally and/or alternatively include the reservoir and pump being along a trunk of the flowpath and the centrifugal separator is along a first branch of the flowpath off the trunk.

A further embodiment of any of the foregoing embodiments may additionally and/or alternatively include: the damper being a first damper and the damper chamber is a first damper chamber; the flowpath having a second branch off the trunk to a second damper chamber of a second damper; and a second centrifugal separator having a second unvented chamber is along the second branch.

A further embodiment of any of the foregoing embodiments may additionally and/or alternatively include the flowpath having a third branch off the trunk to a third damper chamber of a third damper; and no centrifugal separator is along the third branch.

A further embodiment of any of the foregoing embodiments may additionally and/or alternatively include the third member being a second end portion of a spring. The spring comprises: a first end portion mounted to the first member; and a flexible portion between the first end portion and the second end portion.

A further embodiment of any of the foregoing embodiments may additionally and/or alternatively include: in an outer diameter surface of the third member, the third member having an outer diameter first groove and an outer diameter second groove; a first annular seal carried by the first groove and sealing with an inner diameter surface of the first member; a second annular seal carried by the second groove and sealing with the inner diameter surface of the first member; and the fluid outlet in the first member being between the first annular seal and the second annular seal.

A further embodiment of any of the foregoing embodiments may additionally and/or alternatively include the machine being a gas turbine engine.

A further embodiment of any of the foregoing embodiments may additionally and/or alternatively include the unvented chamber being effective to decouple an upstream portion of the fluid supply flowpath from a downstream portion of the fluid supply flowpath.

A further embodiment of any of the foregoing embodiments may additionally and/or alternatively include a method for using the machine, the method comprising: introducing a fluid to the damper chamber via the fluid flowpath and fluid outlet; said introducing causing a centrifugal flow of the fluid in the centrifugal separator so as to separate gas from liquid and pass the liquid to the damper chamber while accumulating the gas in the unvented chamber; and rotating the second member relative to the first member, the rotating producing vibrations of the third member relative to the first member, the unvented chamber of the centrifugal separator isolating the fluid supply flowpath upstream of the centrifugal separator from the vibrations.

A further embodiment of any of the foregoing embodiments may additionally and/or alternatively include the rotating comprising: increasing speed of the rotating and pressure of the fluid, the increased pressure initially compressing the gas and reducing a volume of free gas in the centrifugal separator, the increased speed centrifuging further gas to at least partially restore the volume of free gas; and decreasing the speed of the rotating and the pressure of the fluid, the decreased pressure causing expulsion of some of the gas from the unvented chamber to temporarily increase the amount of gas in the oil supplied to the damper chamber.

A further embodiment of any of the foregoing embodiments may additionally and/or alternatively include a method for making the machine. The method comprises: opening a portion of the fluid supply flowpath to the fluid outlet; and installing the centrifugal separator along the opened portion of the fluid supply flowpath.

Another aspect of the disclosure involves a method for operating a fluid damper in a machine. The machine comprises: a first member; a second member; a third member; a bearing having an inner race mounted to the second member and an outer race mounted to the third member; a damper chamber between the first member and the third member; a fluid outlet in the first member to the damper chamber; a fluid supply flowpath to the fluid outlet; and a centrifugal separator along the fluid supply flowpath. The method comprises: introducing a fluid to the damper chamber via the fluid flowpath and fluid outlet; said introducing causing a centrifugal flow of the fluid in the centrifugal separator so as to separate gas from liquid and pass the liquid to the damper chamber while accumulating the gas in a chamber of the centrifugal separator; and rotating the second member relative to the first member causing pressure oscillations in the damper chamber, said chamber of the centrifugal separator isolating the fluid supply flowpath upstream of the centrifugal separator from the pressure oscillations.

Another aspect of the disclosure involves a machine comprising: a first member; a second member; a third member; a bearing having an inner race mounted to the second member and an outer race mounted to the third member; a damper chamber between the first member and the third member; a fluid outlet in the first member to the damper chamber; a fluid supply flowpath to the fluid outlet; and means along the fluid supply flowpath for extracting gas from the fluid and isolating an upstream portion of the flowpath from downstream pressure oscillations.

A further embodiment of any of the foregoing embodiments may additionally and/or alternatively include the means comprising a centrifugal separator/accumulator.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

An initial example of a spring/damper is disclosed as a modification of one of the aforementioned two-piece zigzag section spring/dampers. The identification of two pieces does not mean only two pieces but rather two main pieces. As is discussed below, there may be additional fasteners and the like involved. However, the present teachings may be applied to myriad one- or multi-piece spring configurations or configurations without springs. Furthermore, the teachings may be applied to various seal (if any) arrangements including those discussed as background above.

Figure 1:
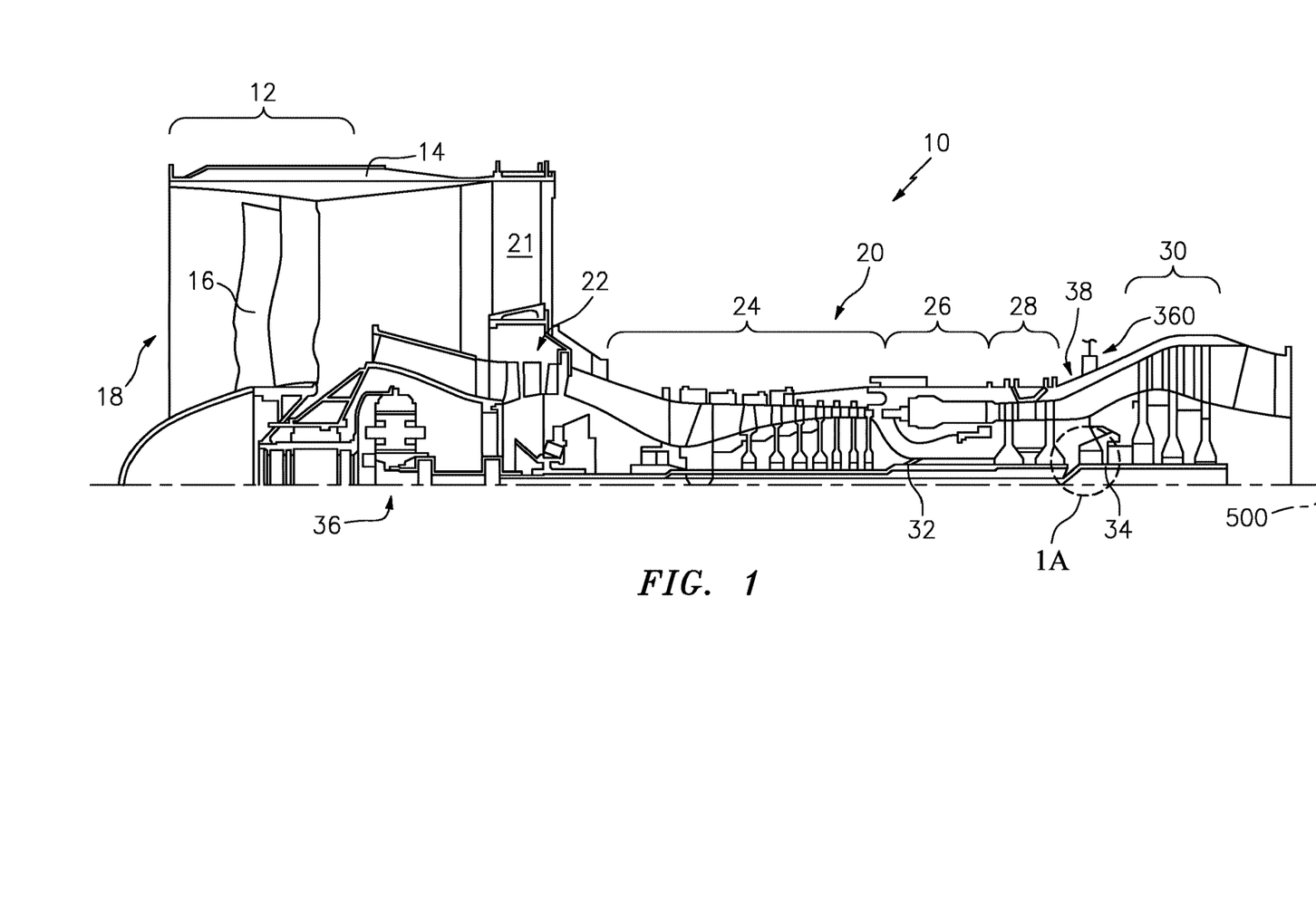
FIG. 1 is a simplified central axial sectional half view of a gas turbine engine.

FIG. 1 shows an exemplary simplified gas turbine engine 10 taken from U.S. Patent Application Publication 20110286836 (the '836 patent) of Davis, Nov. 24, 2011, the disclosure of which is incorporated herein by reference as if set forth at length. Engine 10 includes a fan section 12 within a fan case 14. The fan section 12 includes multiple blades 16 at an inlet 18 of the fan case 14. A core 20 is supported relative to the fan case 14 such as by flow exit guide vanes 21. The core 20 includes a low pressure compressor (LPC) section 22, a high pressure compressor (HPC) section 24, a combustor section 26, a high pressure turbine (HPT) section 28 and a low pressure turbine (LPT) section 30. In one example, the blades of the low pressure compressor section 22 and low pressure turbine section 30 are supported on a low spool 34 rotatable about an axis 500. An epicyclic fan drive gear system (FDGS) 36 couples the low spool rotor to the fan shaft to drive the fan. The blades of the high pressure compressor section 24 and high pressure turbine section 28 are supported on a high spool 32 rotatable about the axis 500. The core has a case (case assembly) 38.

Figure 1A:
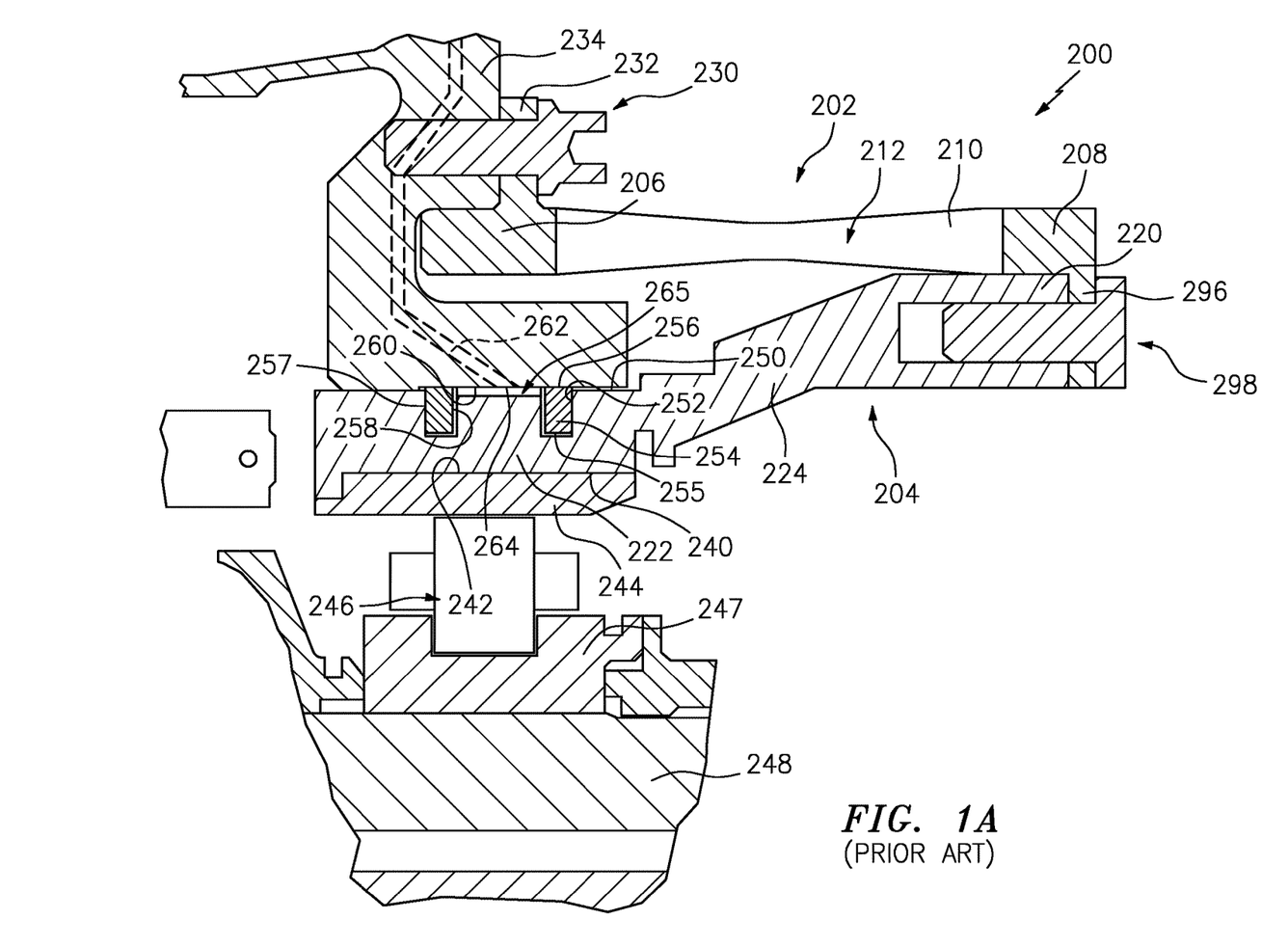
FIG. 1A is an enlarged view of a bearing area of the engine of FIG. 1.

The engine 10 has multiple main bearings as radial and/or thrust bearings (e.g., rolling element bearings such as ball or roller) that may intervene between one of the spools and ground (the case 38) or between two spools. As is discussed below, one or more of the main bearings may have an associated squeeze film damper. FIG. 1A shows one of the main bearings of the engine. FIG. 1A specifically shows a spring/damper system 200 having a first piece 202 and a second piece 204. The first piece has a first annular end portion 206 and an axially opposite second axial end portion 208. In between, a squirrel cage spring portion is formed by legs 210 and associated gaps 212. The second piece 204 comprises a first end portion 220 and a second end portion 222. An intermediate portion 224 extends between the end portions 220 and 222 and may be full annulus or segmented or may otherwise have apertures (see '607 publication) such as for passing fluid lines (e.g., for bearing lubricant) and the like. In the exemplary embodiment, the second piece 204 is relatively rigid compared to the flexibility offered the first piece by its squirrel cage legs 210. As is discussed further below, the first piece first end portion 206 is a proximal portion mounted to static engine structure (e.g., the case) such as via an array of fasteners 230 (e.g., screws) extending through a flange 232 of the first end portion 206 and into an associated flange 234 of the supporting structure (e.g. grounded to/integral with the case in this example).

The second piece 204 second end portion 222 is a distal portion having an inner diameter (ID) face 240 engaging and receiving the outer diameter (OD) face 242 of the outer race 244 of the rolling element bearing 246. The inner diameter (ID) race 247 of the bearing 246 may be mounted to the outer diameter (OD) surface of a shaft 248 (e.g., of the low spool).

The outer diameter (OD) surface 250 of the second end portion 222 bears grooves 252 each carrying a respective seal 254 (as discussed above). Each exemplary seal 254A has an inner diameter (ID) or radially-inboard surface 255 and outer diameter (OD) or radially outboard surface 256. The seal has a first axial end surface or face (axial facing but radially extending) 257 and an opposite second axial end surface 258. The seal OD surface 256 engages the inner diameter (ID) surface 260 of a portion of the static structure. A fluid passageway 262 in the static structure has an outlet 264 to the surface 260 between the seals 254.

The two grooves/seals define a closed damper chamber 265 axially spanning/surrounding the port 264 from the passageway 262. Fluid pressure in the chamber 265 axially biases the seals 254 into engagement with the associated axially outboard end surface of the associated groove 252.

FIG. 1A additionally shows the mounting of the two pieces 202, 204 to each other. In this example, the second end portion 208 of the first piece 202 has a flange 296 having a hole circle. The forward face of the flange 296 abuts the aft face of the first end portion 220 of the second piece 204. The first end portion 220 has a circle of threaded bores complementary to the holes of the flange to respectively receive threaded fasteners 298 (e.g., screws) to secure the two together. Thus, the supporting structure and the second piece 204 respectively serve as a first member and a second member between which the damper chamber is formed. The shaft 248 serves as a third member with the bearing outer race and inner race respectively mounted to the second member and third member.

An exemplary oil supply flowpath 308 (FIG. 2) passes along one or more flowpath roots 310A, 310B . . . 310n from one or more collectors/sumps 320 sequentially through an associated scavenge pump 322 and debris monitor and/or trap 324 (e.g., an electronic monitor and/or a magnetic chip collector as a trap with sight glass for visual inspection by personnel). The flowpath roots then merge in a trunk 330 of the flowpath to then pass through a deaerator 332 (e.g., centrifugal-type with breather vent for extracting air) and oil reservoir 334 (e.g., a tank which may be integrated with the deaerator, with the deaerator comprising a tangential inlet flow to the tank). From the trunk 330, the flowpath then branches through individual branches 340A, 340B . . . 340m to each individual damper via a respective pump 342, filter 344, and valving 346 (e.g., controllable valves such as solenoid valves under control of a controller 350 (I/O lines shown cut away) which may be the overall controller of the engine or a local microcontroller under control of the engine controller). The numbers "n" and "m" may be equal depending on implementation.

Figure 2:
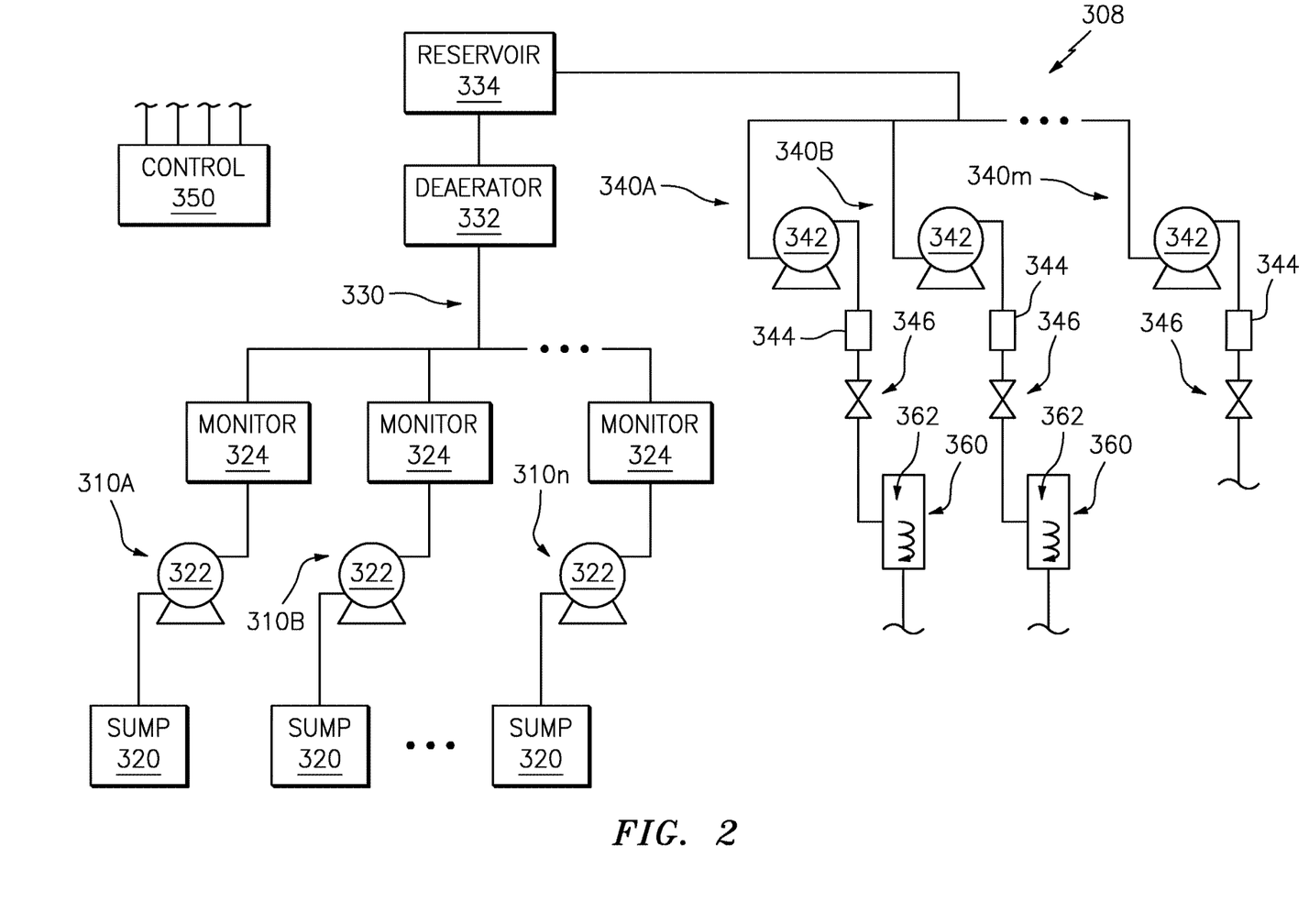
FIG. 2 is a schematic view of an oil supply system for bearings and their dampers.

As is so-far described, the system represents one example of a baseline system. However, to counter resonance phenomena noted above, the system includes means 360 for acoustically isolating one or more upstream portions of the supply flowpath from downstream vibration (e.g., from the damper(s)). The exemplary means comprises one or more cavity(ies) or chamber(s) 362 along the supply flowpath for accumulating air from the air-oil mixture passing to the damper(s) along the flowpath 308. Compressibility of air in the chamber(s) 362 acts as a vibration damper. For example, each exemplary means may be a centrifugal device 360 that is essentially a separator but lacking venting of the chamber 362. The chamber 362 may thus function as an accumulator chamber so that the device 360 functions as a separator/accumulator and ultimately as a self-filling acoustic isolator.

Thus, the device 360 removes sufficient air to fill the accumulator chamber 362, but, when a capacity is reached, passes air downstream to the damper(s) rather than being continuously vented.

In the exemplary embodiment, several of the flowpath 308 branches include such devices 360 while one or more others (which do not need damping) do not.

Figure 3:
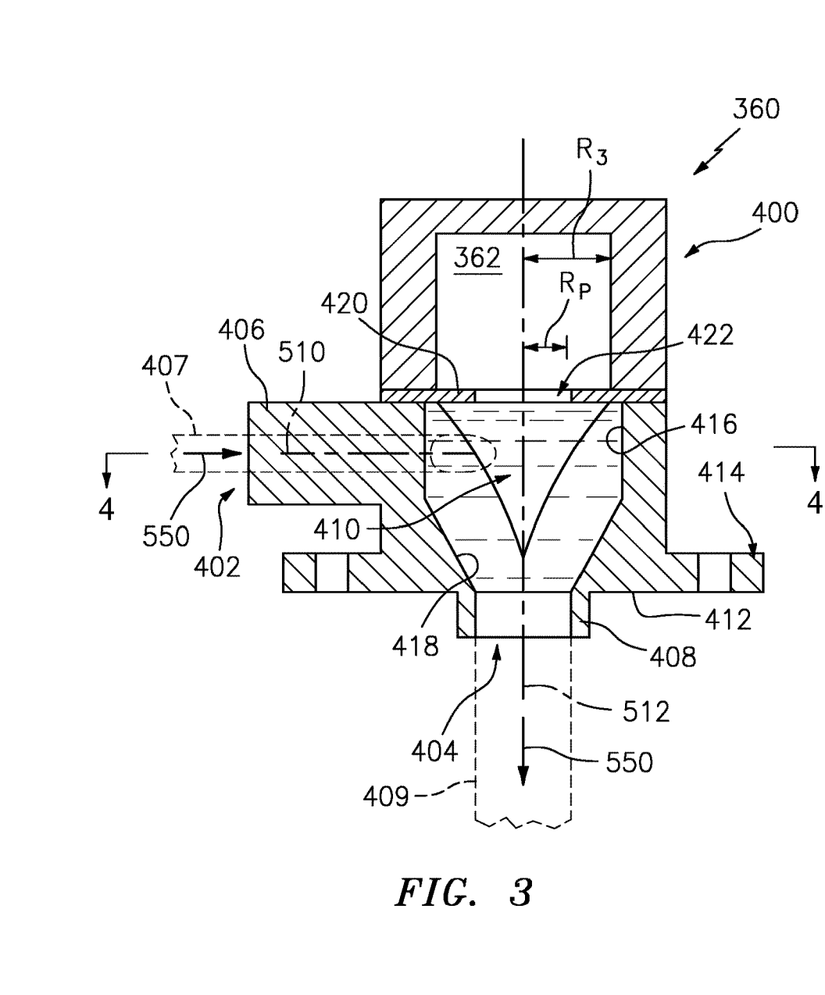
FIG. 3 is a central longitudinal sectional view of a centrifugal separator/accumulator in the oil supply system of FIG. 2
Figure 4:
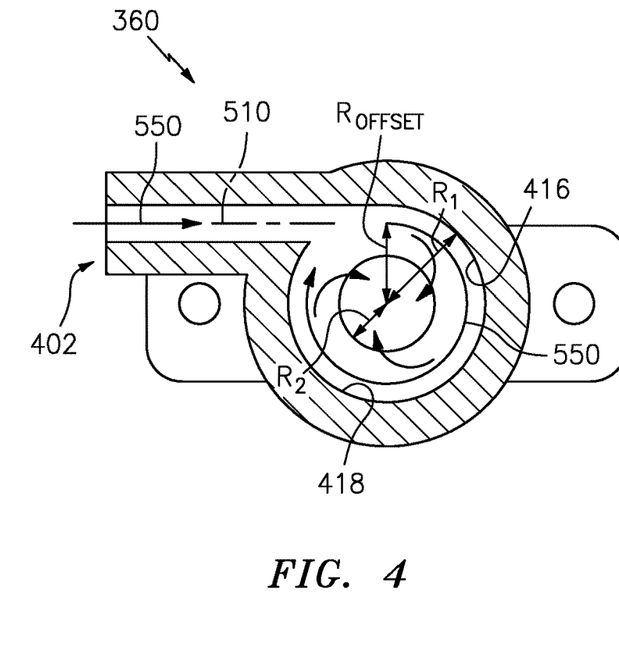
FIG. 4 is a transverse sectional view of the centrifugal separator/accumulator of FIG. 3, taken along line 4-4.

FIG. 3 shows exemplary details of an individual device 360 passing a flow 550. The device 360 has a body 400 having, along its branch of the flowpath 308, an inlet 402 and an outlet 404. These may be fittings 406, 408 (e.g., threaded) for engaging associated conduit (e.g., metal tubing 407, 409) or other fittings. In an exemplary implementation so that the accumulator chamber 362 forms at least a portion of a headspace of the device 360, the body 400 is positioned with the chamber upward and a centrifuge chamber 410 downward. The exemplary body 400 has a lower mounting surface 412 from which an exemplary outlet fitting 408 depends. For mounting to the case, exemplary mounting features include integral mounting ears 414 with associated screw/bolt holes. An upper portion of the centrifuge chamber 410 has an essentially circular cylindrical sidewall surface 416 (inner diameter surface) with a lower portion of the centrifuge chamber having a sidewall surface 418 converging (e.g., frustoconically) to a smaller diameter at the bottom which may correspond approximately to the inner diameter of the outlet fitting 408. FIG. 4 shows the upper portion inner radius as $R_1$ and the lower portion/outlet inner radius as $R_2$ relative to a centrifuge chamber central axis or centerline 512. As noted above, the exemplary axis 512 is oriented vertically and, if the device 360 is at or near the top of the engine (see FIG. 1), the axis 512 may be close to radial.

The exemplary oil supply line/inlet axis 510 is offset (by radius ROFFSET in FIG. 4) from the essentially radial (in the engine frame of reference) axis 512 of the chambers 362, 410 and the outlet 404. As such, the oil has angular momentum with respect to the axis 512 and enters the centrifuge chamber 410 tangentially with respect to the sidewall surface 416. Deflection by the sidewall surface 416 imparts swirl about the axis 512. As the swirling flow flows downstream toward the outlet, the surface 418 directs the swirling flow radially inward and the swirl intensifies due to conservation of angular momentum. The associated centripetal acceleration increases the buoyancy force on any bubbles within the bubbly oil, driving the bubbles toward the axis of rotation (axis 512) whereafter they rise to fill the chamber 362. The particular example of FIG. 3 shows the accumulator chamber 362 separated from the centrifuge chamber 410 by a centrally apertured plate 420. The aperture or port 422 is shown with a circular footprint of radius $R_P$. An internal radius of the accumulator chamber 362 thereabove is $R_3$. In various implementations, $R_3$ may be the same as $R_1$ but may be made smaller or larger to provide a degree of tuning. Similarly, the height (length along the axis 512 of the accumulator chamber 362) may also be used to tune its volume and resonance damping properties.

Providing the port 422 may serve one or more of several purposes. First, the intact portion of the plate 420 surrounding it may serve as a weir or dam preventing the centrifuging flow from passing up into the accumulator chamber 362. Second, particularly when the port 422 is smaller than needed for the weir function, the area of the port 422 may be tuned as in a Helmholtz or other resonator.

When operating on pressurized bubbly mixtures, the accumulator chamber 362 will be filled with air at line pressure. It is desirable to size the air volume to the minimum required to achieve the intended acoustic isolation. If supply pressure increases (e.g., due to increased engine power and rotor/spool speed), the air in the accumulator chamber 362 will initially compress and some of the chamber volume may fill with bubbly oil. However, as the pressurized bubbly oil continues to flow, the centrifuge action will separate additional air which will eventually displace the bubbly oil in the accumulator chamber 362.

If supply pressure decreases (e.g., due to decreased engine power and rotor speed), the accumulator chamber 362 will expel some additional air into the oil supplied to the damper to reach the new equilibrium condition. The larger the chamber volume, the more air will be re-introduced into the oil supply line as supply pressure is decreased. Thus, too large a volume of the accumulator chamber 362 may cause excessive introduction of air to the damper in such a transitional situation.

In designing some embodiments, a designer may use the volume of the oil within the squeeze film damper itself to scale the required chamber volume. In an example, only the volume of the chamber 362 is considered in an initial sizing. The air volume left in the chamber 410 may be smaller (and condition-dependent). The volume of the oil within the squeeze film is typically quite small. The thickness of the squeeze film can be on the order of tens of mils (250 or more micrometers), and the damper radius can be on the order of five inches (127 millimeters), and axial length can be on the order of one inch (25 millimeters). For these dimensions, the total volume of oil within the squeeze film damper is approximately (measured as thickness times length times $2\pi$ radius~0.30 cubic inches (4.9 milliliters). More broadly, exemplary accumulator chamber 362 volumes are 25% of the damper volume to 250% or 300%, more particularly, 50% to 200% or 50% to 100%.

Instead, one could compare combined volume of the accumulator chamber 362 and centrifuge chamber 410 (within the diameters of the surfaces 416 and 418) to the damper volume. This may be a relevant consideration where there is no weir and the accumulator chamber is viewed as the portion of the combined chamber above the inlet. Exemplary ratios of the accumulator chamber volume to the centrifuge chamber volume are between 25% and 200%. Thus, the ranges from the paragraph above could scale with their lower ends increased by 25% and their upper ends increased by 200% when comparing the combined volume to the damper volume. Thus, the 50% to 100% range becomes 62.5% to 300% and so on.

Specific initial selection of chamber size may reflect other parameters including any database of prior optimized configurations for particular bearing locations, damper chamber sizes, oil flow rates, target operational speeds, and the like. Further optimization may involve computer simulation or iterative optimization on an actual engine.

The chamber is effective to decouple an upstream portion of the fluid supply flowpath (and its physical supply conduit/ line) from a downstream portion of the fluid supply flowpath. By decoupling the supply line dynamics from the squeeze film damper, Campbell crossings lose their significance.

The accumulator chamber 362 being open to the flowpath 310 may have one or more of several advantages over a hypothetical alternative gas-filled bladder accumulator along the supply flowpath upstream of the squeeze film damper.

Traditional gas-filled bladder accumulators used in other fields have undesirable features for use on gas turbine engines to decouple supply lines and squeeze film dampers. The bladder can leak, or wear out, and can introduce debris into a high precision oil lubrication system.

Additionally, oil supply pressures vary from ambient pressure at starting condition to several hundred pounds per square inch (several MPa) at maximum power conditions, making managing the size and effectiveness of a gas-filled bladder difficult.

When implemented as a modification of a baseline (e.g., prior art such as those referenced above) configuration, the foregoing teachings may be implemented at various levels. The modification may be a reengineering for new production or may be a retrofit/remanufacture of existing hardware. A first order retrofit/remanufacture is simply to open a portion of the existing flowpath (e.g., unthreading or otherwise uncoupling a length of conduit such as metallic tubing/ piping). The centrifugal separator may be installed along the opened portion (e.g., mounting the separator to the case and installing a pair of conduit segments to join upstream and downstream fittings of the separator housing to existing ends of the flowpath portion.

There may be many second order or beyond modifications. For example, some modifications may involves altering aspects of the oil supply.

Manufacture may be by conventional materials and techniques (e.g., machining the device 360 in one or more pieces from alloys such as steels or titanium alloys or aluminum such as on a milling machine and drilling/tapping any required holes for fasteners or conduits). Alternatively, one or more of the pieces may be made by additive manufacture techniques (e.g., electron beam melting (EBM) or direct metal laser sintering (DMLS)). Assembly may be via such fasteners or via other techniques such as welding or brazing as may be appropriate.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A machine comprising:
a first member;
a second member;
a third member;
a bearing having an inner race mounted to the second member and an outer race mounted to the third member;
a damper chamber between the first member and the third member;
a fluid outlet in the first member to the damper chamber;
a fluid supply flowpath to the fluid outlet; and
a centrifugal separator comprising:
an inlet;
an outlet; and
an unvented chamber extending above the inlet and outlet and open to and locally above the fluid supply flowpath.

2. The machine of claim 1 wherein the unvented chamber has a volume 25% to 300% of a volume of the damper chamber.

3. The machine of claim 1 wherein the centrifugal separator comprises:
a centrifuge chamber wherein the inlet is positioned to introduce a flow tangentially to a first sidewall surface of the centrifuge chamber; and
a second sidewall surface portion converging from the first sidewall surface portion toward the outlet.

4. The machine of claim 3 wherein the centrifugal separator comprises:
a centrally apertured plate between the unvented chamber and the centrifuge chamber.

5. The machine of claim 1 wherein the centrifugal separator is an unpowered separator.

6. The machine of claim 1 wherein the centrifugal separator comprises:
a downstream convergent portion positioned to receive a tangential flow from the inlet and pass the flow to the outlet, the unvented chamber extending above the downstream convergent portion.

7. The machine of claim 1 further comprising, upstream of the centrifugal separator along the fluid supply flowpath:
a reservoir; and
a pump.

8. The machine of claim 7 wherein:
the fluid comprises oil.

9. The machine of claim 7 further comprising, upstream of the centrifugal separator along the fluid supply flowpath:
a deaerator.

10. The machine of claim 7 wherein:
the reservoir and pump are along a trunk of the flowpath; and
the centrifugal separator is along a first branch of the flowpath off the trunk.

11. The machine of claim 7 wherein:
the damper is a first damper and the damper chamber is a first damper chamber;
the flowpath has a second branch off the trunk to a second damper chamber of a second damper; and
a second centrifugal separator having a second unvented chamber is along the second branch.

12. The machine of claim 11 wherein:
the flowpath has a third branch off the trunk to a third damper chamber of a third damper; and
no centrifugal separator is along the third branch.

13. The machine of claim 1 wherein:
the third member is a second end portion of a spring, the spring comprising:
a first end portion mounted to the first member; and
a flexible portion between the first end portion and the second end portion.

14. The machine of claim 1 wherein:
in an outer diameter surface of the third member, the third member has an outer diameter first groove and an outer diameter second groove;
a first annular seal is carried by the first groove and sealing with an inner diameter surface of the first member;
a second annular seal is carried by the second groove and sealing with the inner diameter surface of the first member; and
the fluid outlet in the first member is between the first annular seal and the second annular seal.

15. The machine of claim 1 being a gas turbine engine.

16. The machine of claim 1 wherein:
the unvented chamber is effective to decouple an upstream portion of the fluid supply flowpath from a downstream portion of the fluid supply flowpath.

17. A method for using the machine of claim 1, the method comprising:
introducing a fluid to the damper chamber via the fluid flowpath and fluid outlet;
said introducing causing a centrifugal flow of the fluid in the centrifugal separator so as to separate gas from liquid and pass the liquid to the damper chamber while accumulating the gas in the unvented chamber; and
rotating the second member relative to the first member, the rotating producing vibrations of the third member relative to the first member, the unvented chamber of the centrifugal separator isolating the fluid supply flowpath upstream of the centrifugal separator from the vibrations.

18. The method of claim 17 wherein the rotating comprises:
increasing speed of the rotating and pressure of the fluid, the increased pressure initially compressing the gas and reducing a volume of free gas in the centrifugal separator, the increased speed centrifuging further gas to at least partially restore the volume of free gas; and
decreasing the speed of the rotating and the pressure of the fluid, the decreased pressure causing expulsion of some of the gas from the unvented chamber to temporarily increase the amount of gas in the oil supplied to the damper chamber.

19. A method for making the machine of claim 1, the method comprising:
- opening a portion of the fluid supply flowpath to the fluid outlet; and
- installing the centrifugal separator along the opened portion of the fluid supply flowpath.

20. A method for operating a fluid damper in a machine, the machine comprising:
- a first member;
- a second member;
- a third member;
- a bearing having an inner race mounted to the second member and an outer race mounted to the third member;
- a damper chamber between the first member and the third member;
- a fluid outlet in the first member to the damper chamber;
- a fluid supply flowpath to the fluid outlet; and
- a centrifugal separator along the fluid supply flowpath, the method comprising:
- introducing a fluid to the damper chamber via the fluid flowpath and fluid outlet;
- said introducing causing a centrifugal flow of the fluid in the centrifugal separator so as to separate gas from liquid and pass the liquid to the damper chamber while accumulating the gas in a chamber of the centrifugal separator; and
- rotating the second member relative to the first member causing pressure oscillations in the damper chamber, said chamber of the centrifugal separator isolating the fluid supply flowpath upstream of the centrifugal separator from the pressure oscillations.

21. A machine comprising:
- a first member;
- a second member;
- a third member;
- a bearing having an inner race mounted to the second member and an outer race mounted to the third member;
- a damper chamber between the first member and the third member;
- a fluid outlet in the first member to the damper chamber;
- a fluid supply flowpath to the fluid outlet; and
- means along the fluid supply flowpath for extracting gas from the fluid and isolating an upstream portion of the flowpath from downstream pressure oscillations.

22. The machine of claim 21 wherein:
the means comprises a centrifugal separator/accumulator.

* * * * *